United States Patent

[11] 3,627,164

[72] Inventor Robert A. Wilson
 Cranford, N.J.
[21] Appl. No. 1,726
[22] Filed Jan. 9, 1970
[45] Patented Dec. 14, 1971
[73] Assignee Esso Research and Engineering Company

[54] METHOD AND APPARATUS FOR MAINTAINING UNIFORM INSULATION DENSITY
16 Claims, 2 Drawing Figs.

[52] U.S. Cl. .................................................. 220/10,
 62/45, 99/238, 114/74 A
[51] Int. Cl. .................................................. B65d 7/22
[50] Field of Search .......................................... 220/9, 9
 LG, 10; 114/74 A; 62/45; 99/238

[56] References Cited
UNITED STATES PATENTS

| 3,256,000 | 6/1966 | Howlett, Jr. | 220/9 X |
| 2,513,749 | 7/1950 | Schilling | 220/10 X |
| 2,963,874 | 12/1960 | Means et al. | 220/10 X |

Primary Examiner—M. Henson Wood, Jr.
Assistant Examiner—Michael Y. Mar
Attorneys—Manaham and Wright and Donald F. Wohlers ABSTRACT: A process and apparatus for maintaining uniform density of granular-type insulation which is subject to packing. Short gas blasts, from strategically disposed jets fluff the insulation when packing occurs to restore original density. The gas blasts can be triggered by automatic-type control devices which indicate a packed condition.

Patented Dec. 14, 1971

3,627,164

Robert A. Wilson  Inventor

By *Donald F. Wilson* Attorney

METHOD AND APPARATUS FOR MAINTAINING UNIFORM INSULATION DENSITY

BACKGROUND OF THE DISCLOSURE

The instant invention is directed to a new and novel method and apparatus for maintaining insulation effectiveness. More specifically, the instant invention is directed to maintaining uniform density of a granular-type insulation. Still more specifically, the instant invention is directed to a method and apparatus for maintaining uniform density of a granular-type insulation disposed between the inner and outer walls of a double-shelled storage vessel.

It is well known in the art that one of the most effective methods for insulating large storage tanks holding petroleum or chemical liquid products is to use a double-wall tank with an insulator disposed between the inner and outer walls. In such cases, granular-type insulation is often used to provide the insulation. Not only is a granular-type insulation more effective than any other, but more importantly it is probably the most economically feasible insulation to use. This is due to the ease of loading such insulation. Since the insulation is granular it is simply poured into the space between the inner and outer walls from the highest point thereof. Thus, difficult to reach points in the vessel structure are easily filled since all points in the system are reached by gravity flow of the almost fluidized solid. The type of insulation herein described is not limited to storage tank applications. Because of the effectiveness of granular insulation it is employed in many other applications. HOwever, the use of granular-type insulation finds unique application in insulating storage tanks.

One of the principal difficulties surrounding the use of granular-type insulation is the tendency of the insulation to fall to a lower point by gravity and thus pack. This results in an uneven distribution of the insulation. Uneven distribution of granular insulation results in lower insulation effectiveness. Originally the insulation is loaded so as to produce a percentage void space which results in minimum heat transfer between the inside of the vessel and the surroundings. At the top of the tank, after packing, the decreased height of insulation results in increased heat transfer. This is caused by the increased ratio of air to insulation at the top. The insulation has a lower thermal conductivity than that of air. Thus, by decreasing the insulation density, due to packing, one increases heat transfer across the insulated space.

Fortunately, the effect of decreased insulation at the top portions is minimal and the increased heat transfer resulting therefrom is not too significant. On the other hand, the effect of packing at the lower points in the tank is quite serious. As stated above there is an optimum void percentage space associated with granular insulation. When the percentage void space is decreased below a certain level, the effectiveness of the insulation also decreases. This is caused by the direct heat path across the material insulated inside the vessel and the surroundings.

The tendency for granular insulation to seek a lower level due to the effect of gravity would not in itself create much of a problem even over the span of many years. However, this effect is accelerated when the vessel in which the insulation is disposed is subject to outside forces such as vibrations and the like. Vibratory forces manifest themselves due to ground vibration or sloshing of the materials contained within the vessels to be insulated. Another outside force which has an important effect on packing of granular insulation is thermal stresses. It is obvious that significant temperature differences exists between the inner wall and outer wall of the tank. This causes relative motion of the heated and unheated granular particles near each of these walls. This effect becomes important in those applications in which the temperature differences between the inner wall and outer wall are quite marked. Thermal movements are particularly important in one of the most important applications for the use of this type of insulation. That is, the insulation of cryogenic materials in tanks. It is in this application where the most difficult packing problems arise and it is to this application that the instant invention is particularly directed.

BRIEF SUMMARY OF THE INVENTION

The instant invention is directed to an apparatus and method for unpacking of granular-type insulation as soon as the distribution of the insulation indicates that the initial uniformity of the granules has been upset. In this way the major disadvantage of the use of granular insulation is overcome.

In accordance with the instant invention, an insulation system comprising a double-walled vessel filled with a granular-type insulation disposed in the space between the inner and outer wall of said vessel is improved by the apparatus which comprises in combination a conduit means in communication with a source of superatmospheric gas, a plurality of nozzle means disposed throughout the space between the inner and outer wall and in communication with said conduit means, a plurality of control means, each of said control means controlling one of said nozzle means, and responsive to the density of the insulation proximate to each of the nozzle means whereby gas is selectively injected through the insulation so as to maintain its original uniformity. Alternatively, in smaller applications, a single control means responsive to the density of the insulation in the space between the inner and outer walls is used to control the injection of gases into the insulation by the nozzle means.

BRIEF DESCRIPTION OF THE DRAWINGS

The invention may be better understood by reference to the accompanying drawing of which.

DETAILED DESCRIPTION

Figure 1:
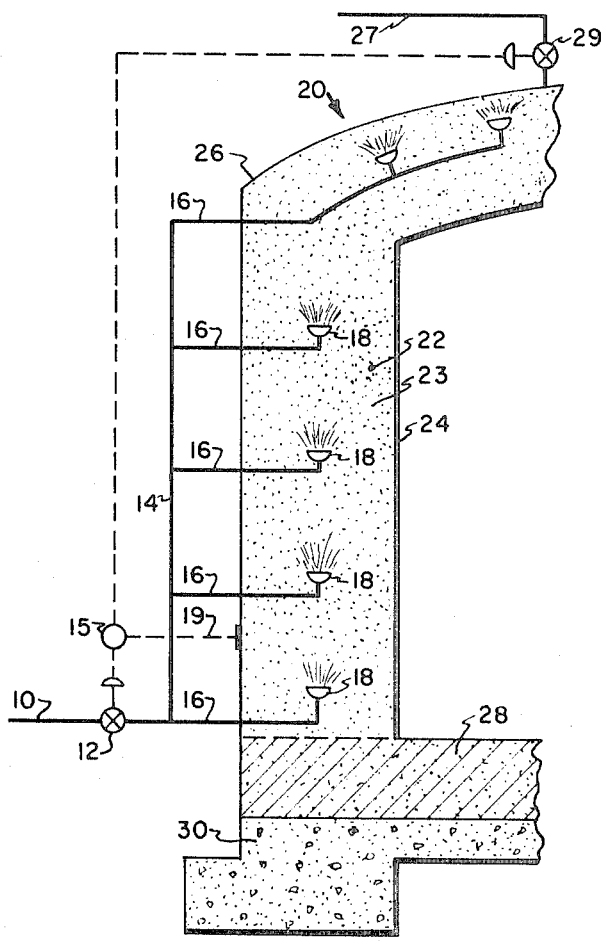
FIG. 1 is a sectional elevation view of a portion of an insulated vessel in which the instant invention is employed to maintain uniform distribution of the insulation.

Figure 1 illustrates a preferred embodiment of the instant invention applied to a double-walled insulation storage vessel. A portion of the storage vessel, generally indicated at 20 is illustrated in a sectional elevation view. The roof and sidewalls of the double-walled vessel 20 is disposed over a tank bottom 28 which typically is comprised of a rigid insulation material. Disposed beneath the tank bottom 28 is a concrete foundation 30 which provides the principle support for the vessel 20.

The storage vessel 20 is insulated by means of an insulation packed double-walled structure. Thus, the space 23 between the outer wall 26 and the inner wall 24 is filled with a granular-type insulation 22. Granular-type insulation materials of the type used in large storage facilities usually comprise an inert nonflammable mineral material having a very low thermal conductivity. Probably the most common type of granular-insulating material is Perlite. Perlite possesses all the characteristics enumerated above and consists essentially of silica, alumina and water. There are many other such materials. Perlite is cited as an illustration and in no way limits the materials that can be used for this purpose. In addition, synthetic materials may be employed rather than natural occurring mineral materials. For instance, fiber glass is often employed as a granular-type insulator. All these materials have one common characteristic based on their particle size. That is, they all tend to settle under the force of gravity.

Turning now to the embodiment of the instant invention depicted in FIG. 1 a conduit 10 is in communication with a superatmospheric gas (not shown). The gas must be at some pressure above atmospheric in order to provide a driving force to move the gas into the space 23 between the inner wall 24 and the outer wall 26 which is usually maintained at atmospheric pressure. The conduit 10 is connected at one end to a control valve 12. The valve 12 controls the flow of gas into the space 23 between the walls. It should be appreciated that a system of the kind illustrated in FIG. 1, using a single control valve of the kind illustrated at 12 is applicable to small scale vessels and would not be employed in larger scale vessels as will be described hereinafter. As illustrated in FIG. 1, control valve 12 provides automatic control. As will be described hereinafter a manual control valve may be substituted.

In the case of automatic control by valve 12, gas flows through valve 12 in response to the density of the insulation material 22 in the space 23. This control may be obtained by several methods. Probably the simplest and most effective method is the use of a temperature measuring device in communication with the outside wall 26 of the vessel 20. Using this method, the temperature measuring device most commonly used is a thermocouple wire 19. The thermocouple 19 sends signals indicative of the wall temperature to a control center 15. When the temperature decreases below or increases above a set point the control center 15 signals the valve 12 to open, permitting jets of gas to be injected into the space 23 as will be explained below. This control is based on the well-known principle that a granular material when packed closer together provides a better heat path which results in poorer insulation. It should be appreciated that based on a combination of experimental results and theoretical considerations the temperature of the outside wall 26 can be predicted under usual operating conditions. Usual operating conditions is taken to mean a condition of uniform distribution (no packing) of the granular insulation 22. When the temperature of the outside wall 26 falls below or above the predicted range of outside wall temperatures, depending on whether the material inside the vessel 20 is below or above ambient temperatures respectively, the insulation 22 has packed thus providing improved heat paths across the space 23.

Other means of controlling the valve 12 can also be employed. It is possible to provide a pressure transducer disposed within space 23 at the bottom thereof. When the granules 22 begin to pack, the pressure begins to increase on the transducer. At that time the transducer signals the control center 15 to actuate the valve 12 permitting the flow of gas into space 23. This method is not as advantageous as the preferred method of control in that additional instruments are disposed within the space 23 which causes additional maintenance and fabrication problems. This method is mentioned in order to illustrate the many possibilities for insulation control based on the increased packing at the bottom of the insulation space.

The gas flow through exiting valve 12 next enters a conduit 14. Conduit 14 is in part a manifold to which a plurality of conduits 16 communicate. The parallel disposed conduits 16 terminate at a nozzle device 18. However, it should be appreciated that there may be more than one nozzle 18 connected in parallel to the conduit 16. This situation usually exists at a curved or horizontal surface such as a roof of a tank as illustrated in FIG. 1. The nozzles 18 comprise any means of providing a jet of gas. In a preferred embodiment venturi nozzles are employed for this purpose. Venturi nozzles provide a high-velocity jet of gas which is required to provide sufficient momentum to disperse the packed insulation particles. The nozzles 18 are disposed throughout the space 23. Along vertical length the nozzles are disposed in the center thereof. Along horizontal or almost horizontal lengths such as the roof of a tank the nozzles are disposed very close to the bottommost point in the space 23 since the granular insulation 22 tends to pack at these points along a horizontal or almost horizontal space.

Manual control may be substituted for automatic control by controlling valve 12 manually. If this alternate is used, in a preferred embodiment, temperature measuring means similar to the thermocouples illustrated at 19 are connected to temperature recording means. The operator regulates valve 12 as a function of this temperature. Similarly, manual control may be a function of a pressure-recording means, in which pressure is measured by pressure transducer means in communication with said pressure-recording means.

The gas that is injected into the space 23 must be vented in order to prevent pressure buildup therein. For this purpose an exhaust line 27 is provided, preferably at the uppermost point above the insulated storage vessel. The line is controlled by a valve 29. This valve may be manually or automatically controlled. In a preferred embodiment the valve 29 is controlled by controller 15, the same control center that controls the inlet of gas through valve 12. In this embodiment, the automatic controller 15 communicates a signal, as a function of time or pressure, to valve 29 at some time after the control center 15 has signaled the valve 12 to open. Alternatively, the valve may be manually controlled in which case the valve is manually regulated as a function of the pressure in space 23.

In the case of manual or automatic control based on pressure, a pressure indicator is inserted inside the space 23 and pressure measurements are recorded on a recorder or signalled to the control center 15 to regulate automatic valve 12 respectively. Obviously, many methods may be employed to vent the space 23 and the methods enumerated are for the purposes of illustration.

It should be appreciated that if the gas employed is inert, such as air, nitrogen, carbon dioxide or the like exhaust line 27 leads directly to the atmosphere. However, if the gas employed is combustible such as a hydrocarbon, the line 27 is directed to a burning facility which is called flaring in the petroleum art. Alternatively, depending upon the gas, it may be sent to a low-pressure compression system where the gas is compressed for storage or other use. A discussion of the particular gas used follows.

The gas employed to disperse the granular insulation 22 are gases that do not react with the insulation 22. Obviously, the cheapest and best gas for this purpose is air. Air does not react with any of the inert insulation materials 22 commonly employed such as Perlite. A second requirement that is imposed in the interest of safety, upon the selection of a gas used for fluffing, is that no gas may be used that could react or form a combustible mixture with the material stored inside the vessel 20. This sometimes eliminates the possibility of using air for the fluffing medium. For instance, one of the largest applications for the insulation of double-walled vessels using granular insulation is the storage of liquefied natural gas. Natural gas then is a satisfactory medium for insulation fluffing. Not only does its use prevent a safety problem but due to the supply of the gas on hand is economical as well. Similar considerations would necessitate the use of a hydrocarbon gas in the case of storage of other petroleum products which are combustible with air.

Figure 2:
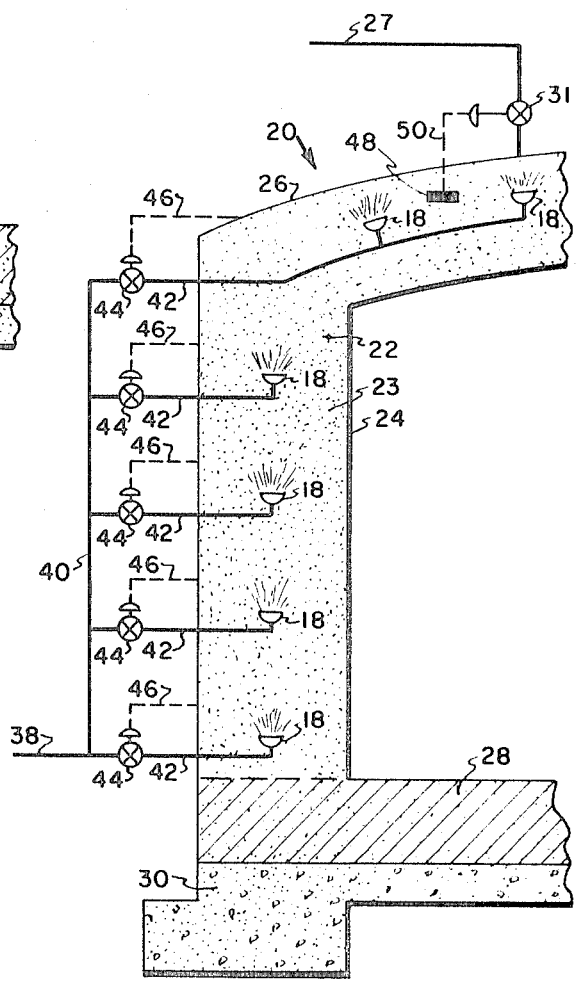
FIG. 2 is another embodiment of a sectional elevation view of a portion of an insulated vessel in which the insulation is kept uniform by an alternate method.

Turning now to FIG. 2, the instant invention is illustrated in a preferred embodiment for large scale vessels. In large scale vessels a single valve of the type illustrated at 12 in FIG. 1 cannot be used to monitor flow because the valve is only responsive to a single point. If the vessel 20 in FIG. 2 is large enough no single point can be illustrative of conditions existing throughout space 23. In order to overcome this problem a plurality of valves 44 is employed. Each of these valves 44 is a control valve responsive to the conditions existing proximate to the nozzle 18 which it controls. Therefore, each of the valves 44 acts in the same way as the single valve 12 in the embodiment illustrated in FIG. 1.

A conduit 38 in communication with a source of superatmospheric gas (not shown) provides a means for transmission of the gas to a second conduit 40 which acts as a manifold means. The manifold line 40 communicates with a plurality of parallel disposed conduits denoted at 42. Along the length of each of the conduits 42 is disposed a control valve 44. The valve 44 as stated above acts in an analogous manner as the single control valve 12 in FIG. 1. Thus, in a preferred embodiment the control valve 44 is responsive to a signal generated by a thermocouple wire. For convenience, the control system is simply illustrated in FIG. 2 so that the signal generated at the outside wall 26 is communicated by a line 46 in communication with control valves 44. Just as in the case of the control valve 12 in the preferred embodiment illustrated in FIG. 1 other means for controlling these valves at 44 may be used. In addition, there is not necessity that the control device used to control one of the valves 44 must be used to control all the others. Therefore, depending upon the disposition of the nozzles 18 in the space 23 it may be convenient and useful to employ a plurality of control means. However, for convenience the preferred method of monitoring the outer wall temperature is illustrated as the method of control of all the valves 44. Again, the gas is injected into the space 23 by means of a plurality of nozzles. Since the same kinds of nozzles are employed in the multicontrol embodiment the nozzles are again denoted as 18. Again a preferred design for the nozzles 18 is a Venturi nozzle which provides a high-velocity jet to impart sufficient momentum so as to disperse the insulation granules 22.

The gas-venting line is again denoted at 27 since it is a similar design to the single control system. It is again preferably disposed at the uppermost point of the storage vessel 20. In a multicontrol valve system of the kind illustrated in FIG. 2, control of the exhaust valve, denoted at 31, cannot be tied to any single control valve. Instead, exhaust valve 31 must be controlled, either manually or automatically, as a function of pressure inside the space 23. In one preferred embodiment pressure measuring means are disposed in the space 23 and the signal generated therefrom is recorded on a recorder. The operator opens and closes valve 31 as a function of the recorded pressure. Alternatively, in the preferred embodiment illustrated in FIG. 2 the control of valve 31 is automatic. A pressure transducer 48 is disposed within the space 23 and generates a signal which flows through a transmission line 50 controlling the opening and closing of valve 31. Since continual opening and closing of valve 31 is necessary, this method of control is preferred.

The gases used in the embodiment illustrated in FIG. 2 are the same as that used in the first embodiment. Moreover, the same considerations as to choice of gas used, discussed above, apply to choice of gases employed in the instant embodiment.

In operation, a reservoir of superatmospheric gas is in communication with a conduit such as that illustrated at 10 and 38 of FIGS. 1 and 2 respectively. The pressure difference between the gas reservoir and the atmospheric pressure in the space 23 causes the gas to flow up to the valve 12 or valves 44. In small size vessels the gas next flows through the control valve 12 and thereafter through a manifold line 14 into a plurality of parallel disposed conduits 16 each in communication with one or more nozzles 18. The nozzles provide the means for introducing the gas into space 23 under high velocity which disperses the insulating granules 22, thus breaking up the packed condition. When the packed insulation condition is relieved, as indicated by the control center 15, the valve 12 is closed and flow ceases. During the fluffing period, control of the pressure inside the space 23 is maintained by time or pressure regulation, as indicated above. It should be appreciated that time may be used to control the pressure inside the space 23 since the amount of gas injected into the space 23 can be calculated so that pressure buildup as a function of time is known. Thus, in all cases the exhaust valve 29 is opened and closed as a function of the pressure inside the space 23.

In the more complex large scale system, flow of the superatmospheric gas beyond manifold line 40 is controlled by the control valves 44. Since each control valve 44 is separately controlled it is not necessary that all the jets operate at once. Gas blasts emit only from those nozzles which are in communication with an area of packed insulation. Gas venting control, during the fluffing period, by means of valve 31 cannot be correlated to any particular valve and is operated as a function of the pressure control means described above, totally independent of the control valves 44. Again, flow of the gas through nozzles 18 is cut off on an individual basis when the packed condition in the area proximate to the nozzle indicates a normal distribution of insulation granules 22.

It should be understood that the embodiments disclosed do not constitute all the possible ways to disperse packed granular insulation. Therefore other embodiments which do not depart from the scope and spirit of this invention should be understood to be covered by the invention as defined by the claims.

I claim:

1. In a double-walled vessel with a granular-type insulation disposed in the space between the inner and outer walls of said vessel, the improvement comprising, in combination, conduit means adapted for communication with a source of superatmospheric gas, gas control means disposed in said conduit means operable as a function of the density of said insulation within a predetermined area of said space, and nozzle means operably associated with said gas control means and said conduit means disposed in said space where packing of said insulation most likely will occur for selectively injecting gas into said space to maintain the desired uniform insulation density.

2. The improved combination of claim 1 wherein said gas control means comprises a control valve which opens and closes as a function of the temperature of the outer wall of said vessel.

3. The improved combination of claim 1 wherein said nozzle means comprises a plurality of nozzles disposed throughout said space between said inner and outer vessel walls, in communication with said conduit means by manifold means.

4. The improved combination of claim 3 wherein a said plurality of nozzles comprise a plurality of Venturi nozzles.

5. The improved combination of claim 1 including venting means disposed in said space between said inner and outer walls whereby injected gas can be selectively exhausted from said space to prevent excessive pressure buildup therein.

6. The improved combination of claim 5 wherein said venting means comprises a control means disposed in an exhaust line wherein said space between said inner and outer wall is exhausted when the pressure in said space exceeds a fixed value.

7. In a double-walled vessel with a granular-type insulation disposed in the space between the inner and outer wall of said vessel the improvement comprising in combination a conduit means in communication with a source of superatmospheric gas, a plurality of nozzle means, in communication with said conduit means, disposed throughout the space between said inner and outer walls, a plurality of control means, each of said control means controlling one of said nozzle means and responsive to the density of said insulation proximate to the nozzle means which said control means regulates, whereby gas is selectively injected through said insulation.

8. The improved combination of claim 7 wherein said nozzle means comprises a plurality of nozzles disposed throughout said space between said inner and outer walls and in communication with said conduit means by means of a manifold line.

9. The improved combination of claim 8 wherein said plurality of nozzles are Venturi nozzles.

10. The improved combination of claim 7 wherein each of said plurality of control means comprises a control valve disposed in a conduit communicating between said nozzle means and said conduit means and responsive to the temperature of the outer wall of said vessel proximate to said nozzle means which said control means regulates whereby said gas is injected selectively to those points in said space, between said inner and outer walls, where the density of said granular insulation exceeds the design density of said insulation.

11. The improved combination of claim 7 including a venting means disposed in said space between said inner and outer walls of said vessel whereby the gas injected into said space is vented when the pressure in said space exceeds the design pressure for said space.

12. The improved combination of claim 11 wherein said venting means comprises an exhaust conduit disposed above the uppermost point of said space, a control valve disposed in said exhaust line, pressure measuring means disposed in said space and means responsive to said pressure measuring means in communication with said control valve whereby said control valve is regulated as a function of the pressure in the space between said inner and outer walls.

13. A method for maintaining uniform distribution of granular insulation in the space between the inner and outer wall of a double-walled vessel comprising:
   a. monitoring said space between said inner and outer wall to determine the pressure and insulation density therein;
   b. subjecting those portions of said space, in which the density is found to be above the design insulation density, to a series of high-velocity gas blasts; and
   c. venting said space, between said inner wall and said outer wall, to relieve the pressure buildup therein when said pressure in said space exceeds the safe limit.

14. The method of claim 13 wherein the step of monitoring the space between said inner wall and said outer wall to determine the insulation density comprises measuring the temperature of the outer wall at a plurality of locations throughout the surface of said vessel whereby nonuniform density is determined as a function of the temperature readings.

15. The method of claim 13 wherein the step of subjecting the space, between said inner wall and said outer wall, to blasts of gas comprises:
   a. disposing a plurality of nozzles throughout said space;
   b. disposing a plurality of conduits in parallel configuration, each of said conduits connected to at least one of said nozzles, and all of said parallel disposed conduits connected to a manifold in communication with a source of superatmospheric gas;
   c. disposing a control valve along the length of each of said parallel disposed conduits and;
   d. opening and closing said control valves individually as a function of the temperature of said outer wall proximate to said nozzle, whereby flow to said nozzles is individually controlled by said control valves.

16. The method of claim 13 wherein the step of venting said space comprises:
   a. measuring the pressure of said space between said inner wall and said outer wall; and
   b. opening and closing a valve located along the length of an exhaust line, in communication with said space, as a function of the pressure measured in step (a).

* * * * *